Dec. 14, 1926.
E. W. MILLER
1,610,571
MODIFIED GEAR SHAPING CUTTER
Filed April 5, 1926
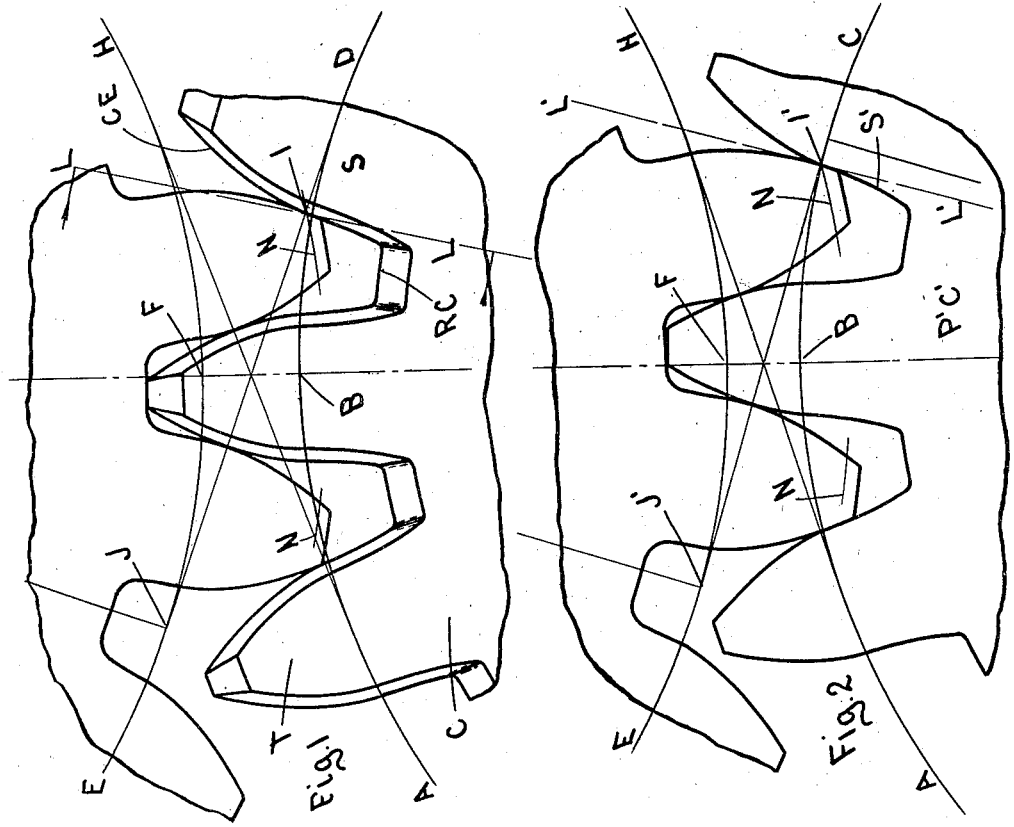
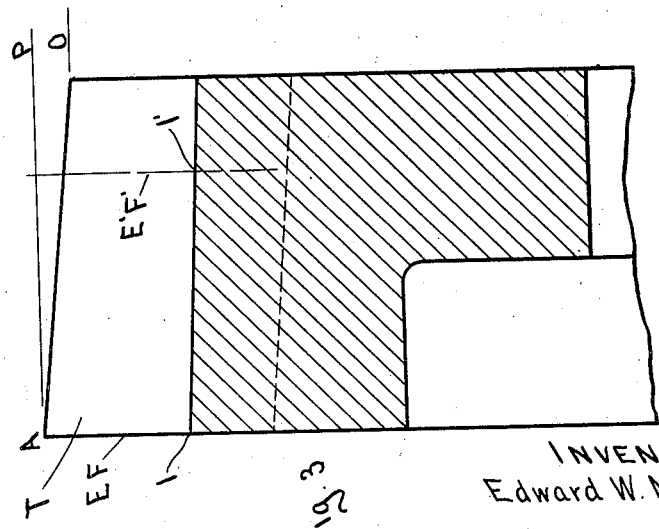
INVENTOR
Edward W. Miller
by Wright, Brown, Quinby & May
att'ys Patented Dec. 14, 1926.

1,610,571

UNITED STATES PATENT OFFICE.

EDWARD W. MILLER, OF SPRINGFIELD, VERMONT, ASSIGNOR TO THE FELLOWS GEAR SHAPER COMPANY, OF SPRINGFIELD, VERMONT, A CORPORATION OF VERMONT.

MODIFIED GEAR-SHAPING CUTTER.

Application filed April 5, 1926. Serial No. 99,737.

The present invention relates to gear shaper cutters of a type now well known, and exemplified in Letters Patent of the United States to E. R. Fellows, No. 676,226, dated June 11, 1901, and others. Such cutters have projections similar to gear teeth which, by analogy, are called the teeth of the cutter; and the sides and outer extremities of such teeth are backed off, that is, inclined inward and toward one another from the end of the cutter in order to provide cutting clearance. They are sharpened when necessary by grinding away the end face of the cutter at the larger end.

The cutters of this type made for cutting involute gears are formed with involute curves at the sides of their teeth. Inasmuch as involute cutters constitute the overwhelming majority of all cutters of the type herein referred to, I have shown in the drawings forming a part of this specification, and will describe in the following explanation of the invention, a cutter of that special form; but without intending thereby to limit my protection otherwise than as required by the intent of the appended claims.

As the material at the end of the cutter is removed by successive grindings, the width of the cutter teeth and the distance to which they project from the axis of the cutter become progressively smaller, owing to their backed off formation, as above set forth. But their face curves remain true, because they are originally so made that the intersections of the side faces of the teeth with all planes perpendicular to the axis of the cutter have the same form; and, in the case of involute gears, all such intersection curves are involute curves of the same base circle as to the parts of the teeth which lie outside of the base circle. Compensation is made for these changes in the dimensions of the cutter, when cutting gears, by so adjusting the gear shaping machine that the center distance between the cutter and the work is shortened by the same amount that the radial length of the cutter teeth is shortened as the result of grinding; wherefore the cutter is effective to cut gear teeth of the same pitch and tooth forms, after being substantially ground away, as before grinding.

Under the present gearing practice, a slight modification or departure from the true characteristic face curvature at one extremity of the gear teeth is desirable to secure quiet running of the gears; and this is particularly true in the case of hardened gears, for hardening frequently causes distortion of the teeth. According to the present invention, the outer extremities of the gear teeth are made narrower than the unmodified gear teeth of standard or conventional form, whereby the sudden and harsh engagement of the outer extremities with the flanks of mating gear teeth is avoided, and the mating teeth come together and leave one another gradually and smoothly, without clashing or causing vibration or noise. I cause such modification to be made by giving the cutter teeth additional thickness in those parts which are intended to form the modified portion of the gear tooth. In other words, the face of the cutter tooth which generates the modified portion of the gear tooth is located outside of (in the sense of being farther away from the radial center line of the tooth than) the line or surface of the conventional tooth form. Such modification or deviation joins smoothly and gradually with the conventional part of the face, and is of a very small order of magnitude. Nevertheless, it is great enough to make a very marked difference in the quietness of running of the gears, and of course it is readily detected and prominently exhibited by the instruments used to test the accuracy of gears and gear cutters. Although small in absolute value, it is relatively large in proportion to the tolerances allowed in the dimensions and form of gear teeth under the present practice of producing accurate gears.

The following description explains the manner in which I have modified involute gear shaper cutters to generate gears in which the tooth face curves at their outer extremities diverge inward toward their radial center lines from the extension of the true involute curve; doing so by oppositely modifying the flanks of the cutter teeth in those parts which finish the outer extremities of the gear teeth. In producing such modified cutter teeth, I have encountered the problem of so joining the divergent or modified flank portions of the cutter teeth with the involute faces thereof that, after the dimensions of the cutter have been changed by repeated sharpenings, and the center distance between the cutter and work in the shaping machine has been shortened in consequence, the cutter will still produce the same modification in the work at the same location. I have solved this problem by producing a modified cutter adapted to cut away the sides of the gear teeth near their outer extremities, substantially without variation at all stages in the life of the cutter, after its dimensions have been substantially altered by repeated sharpening, as well as when first made, when used in the proper way and at the proper center distance from the work.

In the drawings furnished herewith,—

Fig. 1 is a plan view of a fragment of a new cutter embodying this invention; that is, such cutter prior to sharpening, together with a fragment of a completed work piece in operative relation to the cutter;

Fig. 2 is a similar view of the same cutter after a considerable amount of its body has been removed by repeated sharpenings, with a similar work piece in similar relationship thereto;

Fig. 3 is a sectional view of the cutter taken on line L—L of Fig. 1.

Like reference characters designate the same parts wherever they occur in all the figures.

The reference letter C represents the cutter, and T represents the projections on such cutter which are called teeth. G represents a fragment of a gear which has been generated by this cutter in the manner described in prior patents of E. R. Fellows. The cutter, at the outline of its cutting edges, and the work piece here shown are, in effect, conjugate or complemental involute gears. The curved line A—B—D represents the base circle of the involute tooth curves of the cutter, and the curved line E—F—H represents the base circle of the gear tooth curves. The straight line J—I tangent to the base circle curves is one of the lines of action between the two gears so represented. The other line of action is the oppositely inclined tangent shown in the drawing.

Gears which are purely and simply involute gears have involute face curves extending all the way from the base circle, or the root portions, to the outer extremities of their teeth; but in the gear here shown the involute face curve extends outward only as far as a circumferential line N near but within the tooth extremity, and from that line to the extremity, the face curve is modified by deviating toward the radial center line of the tooth slightly away from the continuation of the true involute curve. This deviation is gradual and merges smoothly with the involute curve; and both sides of the teeth are preferably modified in the same way. Such modification enables the gear teeth to come into mesh with complemental gear teeth in a gentle and quiet manner and to leave the teeth when passing out of mesh equally gradually.

The modified form is generated by widening the cutter teeth correspondingly in those parts which act on the parts of the gear tooth between its outer extremity and the line N. The point I designates the point on the cutter tooth where such modification begins. Its distance from the axis of the cutter is determined by the intersection of the curved line N with the line of action J—I, and its location on the cutting edge C—E is graphically shown by drawing such cutting edge in a position where it passes through this point. Corresponding points on the cutting edges of all the cutter teeth are at the same distance from the axis. From the point I to the base circle A—B—D, the side of the cutter tooth diverges outwardly (with respect to the radial center line of the tooth) from the involute curve; and from the base circle toward the root circumference R—C of the cutter tooth, the flank surface S, or, at least, so much of such surface as is intended to have any cutting effect, is inclined outwardly (also with respect to the same center line) from the usual radial flank. In the drawing, the line L—L is radial to the cutter and passes through the point I. The surface S of the cutter tooth is altogether outside of this radial line (using the expression "outside" in this connection as meaning at the opposite side from the middle of the tooth) and it progressively diverges from such radial line as it approaches the root circumference R—C. In the standard involute cutter, the face curves outside of the base circle are true involutes, and the tooth flanks inside the base circle are radial. In the modified cutter of this invention, so much of the modified face as lies outside the base circle is a convex curve outside of the involute, while the flank surface S may be either straight or curved, but always diverges outward from the radius L—L, as to so much of it as does any cutting.

The outer outlines of the cutter teeth shown in Fig. 1 are the cutting edges when the cutter is new and before its teeth have been cut back on the end by sharpening. Comparing Figs. 1 and 3, it will be observed that the circumferential end face of the cutter tooth is inclined so as to make an angle P—A—O with a line P—A from the tip of the tooth parallel to the axis of the cutter; and in Fig. 1 it is shown that the sides or faces of the teeth are also inclined toward one another, away from the cutting end, or axial end of the cutter, in sufficient degree to clear the work and limit engagement of the cutter therewith to the cutting edges, such cutting edges being at the intersections of the tooth faces with the axial end face E—F of the cutter. This face is the one which is ground away to sharpen the cutter. Eventually so much stock is thus removed that the cutter teeth become thinner and also project less far from the axis of the cutter, although their length remains the same because the bottoms of the spaces between them are inclined to the same degree as their outer ends. Their face curves, however, remain as true involutes (except for the modification hereinbefore discussed), outside of the base circle, as previously stated. The compensation for recession of the cutter teeth toward the axis (by adjusting the shaping machine so as to shorten the center distance between the work and cutter spindles and cause the cutter to penetrate to the same depth in the work as before) also compensates for the decreased thickness of the cutter tooth.

Fig. 2 shows the shape of the cutter and its relation to the work after the cutter has been sharpened back to the line E'—F' (Fig. 3), and the center distance between the cutter and work has been shortened accordingly. The line E'—F' has now become the end face of the cutter, and its location in the drawing represents about the extreme distance to which the cutter may be sharpened back. The cutter and work piece have the same base circles in this new relation, and they are designated by the same reference characters as in Fig. 1. The distance F—B, which is the shortest distance between the two base circles, is in Fig. 2 shorter than the corresponding distance F—B in Fig. 1 by the amount of the recession of the outer end of the cutter tooth from the line P—A at the location E'—F'. The line of action in this new relation of the cutter and work is designated J'—I', and the point I' represents also the intersection of the line of action with the circumferential line N, which here, as in the preceding figure, represents the inner limit of the modification in the gear tooth face.

In this part of the cutter also the modified face curve S begins at the point I', and extends thence toward the root circumference R'—C' with outward divergence from the radial line L'—L' of the same general character and approximately the same degree as that described with respect to the surface S in Fig. 1. In this condition, the point I' is nearer to the axis of the cutter than is the point I in Fig. 1, owing to the shortening of the distance between the base lines of the cutter and work and the consequent flatter inclination of the line of action.

The locus of the merger or junction points between the standard or conventional face curve and the modified flank curve of the cutter tooth, in all planes perpendicular to the axis, between the planes at E—F and E'—F', is determinable graphically as explained with reference to the points I and I'. Such locus is a substantially straight line, the position and direction of which is shown with substantial accuracy in an axial profile or section of the cutter by the straight line in Fig. 3 joining the points I and I' thereon, which are located at the same distances from the center of the cutter as the points I and I' in Figs. 1 and 2, respectively. Such line I—I' is thus the junction line between the standard outer part of the tooth face and the modified inner part or flank thereof. This line is inclined to the axis of the cutter in the same direction as the outer face of the cutter tooth, but to a less degree. By virtue of this fact, the modified curve cut in the work always occupies the same portion of the gear tooth generated by this cutter, no matter how great a recession of the cutting edge from the end of the cutter may have occurred as the result of grinding. And the flank surface of the cutter tooth between the line I—I' and the root of the tooth diverges from the normal unmodified form of tooth, in all planes perpendicular to the axis of the cutter, to the requisite extent for cutting back the modified portion of the gear tooth in approximately the same measure, at all stages in the life of the cutter. The character of the modified flank curve is such as will cause the modified surface generated in the work to merge smoothly and gradually with the standard or involute part of the surface, and to deviate gradually and progressively from the standard curve, outside of the limit line N, in such manner, as indicated in the introductory part of this specification, that when the gears so modified are run in mesh with other gears, their teeth will come into contact with mating teeth and will apply pressure thereto in a gradual manner without making sudden contact at any point; and when running out of mesh with the mating teeth will do so and relax their pressure in an equally gradual manner.

Cutters designed for generating gears of different pitches and pressure angles than that here shown, and even cutters designed for generating the identical gear shown in these drawings, but made with different dimensions, embodying the present invention, will vary from the cutter shown in these drawings as to the position of the junction line between modified and unmodified parts of the face and the extent of divergence between the modified flank and the normal or unmodified form; but in all cases the junction line between the conventional or standard part of the cutter tooth face and the modified flank is a line inclining toward the axis of the cutter in the direction away from the larger end of the cutter. This junction line may not be exactly straight, but its divergence at the most from a perfectly straight line is negligible, and for the purposes of this description it may be considered as approximately or substantially straight. The explanation which I have herein given in terms of a single tooth of the cutter applies equally to all teeth, and to both faces of each tooth in the case of cutters designed for producing symmetrical spur gears.

Preferably, cutters made according to the present invention are made with teeth somewhat thicker than those of the standard cutters generally used, by the amount of the prescribed backlash of the gears, in order that when fed to the standard depth in the work they will cut the gear teeth with provision for such backlash. But this extra tooth thickness is not essential, and the cutter teeth may be of standard or any other desired thickness without departure from the invention which I claim.

What I claim and desire to secure by Letters Patent is:

1. A gear shaping cutter of the character described, having teeth with faces which are backed off to give cutting clearance for the cutting edges at one end of the cutter, such faces, in all planes perpendicular to the axis of the cutter, for a prescribed distance inward from their outer extremities, being involute curves of a base circle of the same radius, and within the limit of such distances the flanks of the teeth diverge from the continuation of the involute curves in the direction toward the root of the tooth and outwardly from the radial center line of the tooth.

2. A gear shaping cutter of the character described, having backed off faces which, in all planes perpendicular to the axis of the cutter, are involute curves of the same base circle as to the outer parts of the teeth, and as to their inner parts diverge from the continuation of the involute curve and away from the radial center line of the tooth toward the root circumference of the cutter, the junction points between the said different parts of the tooth curves in all of said planes being in a substantially straight line which is inclined to the axis of the cutter.

3. A gear shaping cutter of the character described, having involute face curves outside of a given distance from the axis and modified flanks inside of such distance, such face curves and flanks merging together on a line which is inclined with respect to the axis of the cutter.

4. A gear shaping cutter of the character described, having teeth with involute faces and flanks which diverge outwardly from the continuation of the involute curve and from the radial direction, in approaching the root of the tooth, the divergence of said flank from the involute face being gradual and commencing at a line which is in the tooth face and is inclined to the axis of the cutter.

5. A gear shaping cutter of the character described, having teeth, the faces of which are involute curves from their extremities to a given point in the side of the tooth, and from such given point toward the root circumference of the cutter, the sides of the tooth extend outward beyond the standard form, the locus of all the points in the tooth face from which such divergence begins lying in a line which is inclined to the axis of the cutter.

6. A gear shaping cutter of the character described, having teeth with face curves of standard form for a portion of the distance inward from the outer extremities of the teeth, and having modified flanks between such portions and the roots of the teeth, the junction between such standard and modified portions of the tooth faces being on approximately straight lines inclined to the axis of the cutter.

In testimony whereof I have affixed my signature.

EDWARD W. MILLER.